United States Patent Office — 3,150,131, Patented Sept. 22, 1964

3,150,131
AMINOHYDROXY QUATERNARY AMMONIUM COMPOUNDS
Richard W. Fulmer, Minneapolis, and Edgar R. Rogier, Hopkins, Minn., assignors to General Mills, Inc., a corporation of Delaware
No Drawing. Filed July 26, 1961, Ser. No. 126,897
16 Claims. (Cl. 260—247.7)

This invention relates to novel quaternary ammonium compounds, and more particularly to novel quaternary ammonium compounds prepared from amino hydroxy nitriles.

The novel compounds of the present invention are represented by the formula:

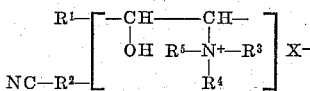

wherein $R^1$ is hydrogen or a monovalent hydrocarbon radical having 1 to 21 carbon atoms, preferably 5 to 17 carbon atoms, $R^2$ is a divalent hydrocarbon radical of 1 to 21 carbon atoms, preferably 5 to 17 carbon atoms, the total number of carbon atoms in $R^1$ and $R^2$ is in the range of 6 to 22 carbon atoms, preferably 10 to 16 carbon atoms, $R^3$ and $R^4$ are selected from the group consisting of aliphatic radicals, aryl radicals, and a heterocyclic ring containing both $R^3$ and $R^4$, $R^5$ is selected from the group consisting of aliphatic radicals and aryl radicals, and X is a quaternary forming anion.

The above formula represents two groups of isomeric compounds which are represented by the formulas:

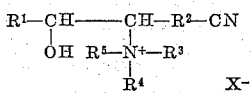

and

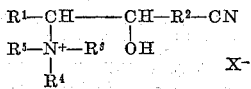

wherein $R^1$, $R^2$, $R^3$, $R^4$, $R^5$, and X are as defined above. Hereinafter the description will be restricted to one isomeric form; however, it will be understood that the description applies equally to both isomers.

The compounds of the present invention can be prepared by a great number of routes. The selection of the most desirable route depends upon the usual considerations of selecting a preparative procedure, for example, the availability of starting materials, the quantity of product desired, the desired purity of the final product and the like. In this particular case, however, the most important consideration appears to be the nature and variety of the substituents $R^3$, $R^4$ and $R^5$. Where each of these radicals is identical, a very simple preparative procedure can be employed. Somewhat more complicated routes are necessary in order to obtain a variety of substituents.

Shown below are equations which illustrate a typical preparation of a compound in which the substituents are identical, employing oleic acid as a starting material:

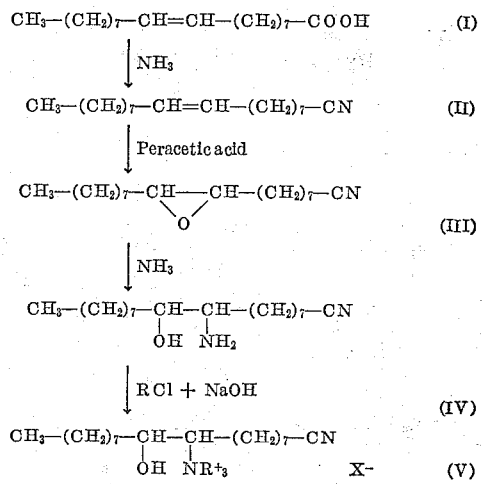

where R is aliphatic or aryl and X is as defined above.

The unsaturated fatty nitriles (II) can be prepared by reacting ammonia and a naturally occurring unsaturated higher fatty acid (I), such as oleic, erucic, eleostearic, linoleic, linolenic, clupanodonic, palmitoleic, and palmitolenic acids, forming thereby unsaturated fatty nitriles (II) having an even number of carbon atoms. Since higher fatty acids having an odd number of carbon atoms are rare, unsaturated fatty nitriles (II) having an odd number of carbon atoms are preferably prepared by the reaction of an unsaturated alkyl halide and an inorganic cyanide. The unsaturated higher fatty acids, supra, occur naturally in animal and vegetable fats and oils. The unsaturated alkyl halides may be prepared by converting an unsaturated fatty acid to an alcohol and subsequently reacting the alcohol with a halogen acid to form the unsaturated alkyl halide.

The unsaturated nitrile (II) is converted to the epoxy nitrile (III) by treatment with peracetic acid under typical epoxidation conditions. The epoxy nitrile (III) is converted to the aminohydroxy nitrile (IV) by treatment with ammonia.

The desired hydroxy nitrile quaternary ammonium compound (V) is conveniently prepared by treating the aminohydroxy nitrile (IV) with an excess of organic halide and sodium hydroxide. The type of organic halides is not critical; all aliphatic and aromatic halides are generally useful. The sodium hydroxide absorbs and neutralizes the hydrochloric acid by-product of the reaction, thereby forcing the reaction to completion. Other similar strong bases can be substituted for the sodium hydroxide if desired. Generally, it is preferable to carry out the reaction at a temperature of about 0 to 150° C. Where the organic halide is volatile at these temperatures, the reaction is conveniently carried out in an autoclave or other pressurized type of reactor.

Where mixed substituents on the nitrogen atoms are desired, somewhat different techniques are employed. Reacting the epoxy nitrile (III) with a primary or secondary amine will provide mono-substituted and di-substituted amino groups respectively:

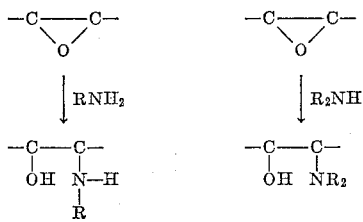

Where a primary amine is used to open the epoxy ring, the remaining substituents are introduced on the nitrogen atoms by the quaternization technique described above. This preparative procedure permits the formation of compounds having two substituents on the nitrogen atom which are alike. Where a secondary amine is used to open the epoxy ring, two substituents are introduced on the nitrogen atom adjacent to the hydroxyl group. The remaining substituents can then be introduced by the standard quaternization technique. This procedure permits the preparation of compounds in which each of the substituents on the nitrogen atom is different.

Examples of organic halides which are useful in the process of the present invention include methyl chloride, methyl bromide, methyl iodide, ethyl chloride, ethyl bromide, butyl bromide, hexyl chloride, cyclohexyl chloride, cyclohexyl bromide, octyl chloride, dodecyl chloride, benzyl chloride, benzyl bromide, naphthyl chloride and the like.

To prepare quaternary ammonium compounds having anions other than halides, e.g., nitrate, sulfate, nitrite, sulfite, phosphate, azide, etc., a solution of the quaternary ammonium halide is passed through an ion exchange resin which retains the cation portion but passes the anion portion through the resin. The desired product is then displaced from the resin by treatment with an eluant having the desired anion.

An alternative method for preparing quaternary ammonium compounds other than the halides, is by substituting a different organic compound in the quaternization reaction. Examples of such materials are the organic sulfates, and the organic nitrates.

When an acid having more than one double bond is employed as the starting material of the aforementioned preparative procedures, there is formed a product having a plurality of hydroxyl substituents and a plurality of quaternary ammonium nitrogen compounds. For example, when linoleic acid is so treated, there is formed a compound having the formula:

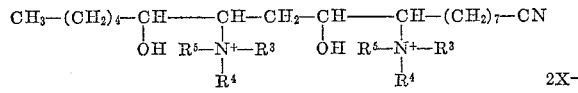

where $R^3$, $R^4$, $R^5$, and X are as previously defined. In addition to this compound, there are formed three position isomers wherein the position of the hydroxyl groups and the quaternary nitrogen atoms, are reversed.

Another preferred starting acid is the mono-saturated hydrogenation product of linoleic acid. This product is a mixture of acids having unsaturation between the number 9 and 10 carbon atoms and acids having unsaturation between the number 12 and 13 carbon atoms. The 9-10 unsaturate is oleic acid which has been used as an illustration for the preparative procedures. The 12-13 unsaturates when treated by similar procedures, give the compounds of the formula:

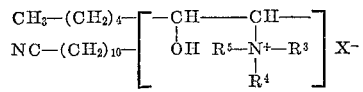

Still another group of preferred compounds are those prepared from palmitoleic acid. These compounds have the formula:

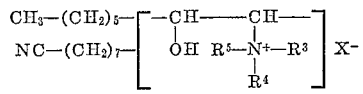

Thus the most preferred group of compounds are those represented by the formula:

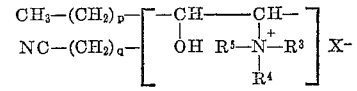

wherein $R^3$, $R^4$, $R^5$, and X are as previously defined, and $p+q$ is 12 or 14.

As stated initially, the preparation of the compounds of the present invention by the routes illustrated will produce a mixture of isomers, since the epoxy ring may be split at either carbon to oxygen bond. In the reaction schemes illustrated above, the two groups of isomers are the 1-cyano-9-(N,N,N-trisubstituted ammonium)-10-hydroxyheptadecane chloride and the 1-cyano-10-(N,N,N-trisubstituted ammonium)-9-hydroxyheptadecane chloride. Isomers of this type are conveniently referred to by an alternative nomenclature, e.g., 1-cyano-9(10)-(N,N,N - trisubstituted ammonium) - 10(9) - hydroxyheptadecane chloride which would include both isomers stated above.

The isomeric products produced by the above-described preparative procedures can be readily separated by conventional methods. Generally however, the mixture of isomers is as useful as the individual isomers. In such cases, the separative process can be avoided.

In order to further illustrate various aspects of the present invention, as well as the preferred embodiments thereof, the following examples are included. Unless otherwise stated, all parts and percentages used herein are by weight.

*Example I*

Into a 1 liter stirred autoclave were charged 21.5 grams of 9(10)-dimethylamino-10(9)-hydroxystearonitrile having an amine number of 176 and an equivalent weight of 230, and 200 milliliters of isopropyl alcohol. The autoclave was then sealed and the reactor pressurized with methyl chloride. The reaction mixture was then heated for two hours at 80 to 90° C. under a constant pressure of methyl chloride of 45 to 48 p.s.i.g. The reaction mixture was cooled, and solvent removed under vacuum. During the reaction period 60 grams of methyl chloride was consumed. The product was treated with water and ether. Two layers formed, and five grams of unreacted amines were recovered from the ether layer and 11 grams of 1-cyano-9(10)-(trimethyl ammonium)-10(9)-hydroxyheptadecane chloride having a total amine number of 2.2, and an amine number of 152 after treatment with mercuric acetate (a measure of the quaternary ammonium nitrogen atoms and amine nitrogen atoms), an amine hydrochloride number of 8.3 (determined by titration with KOH to a phenolphthalein end point), and 8.9% chlorine as compared to theoretical values of 0, 155, 0, and 9.5% were recovered from the aqueous layer. When 9(10)-morpholino-10(9)-hydroxystearonitrile is substituted for the 9(10)-dimethylamino-10(9)-hydroxystearonitrile of this example, there is obtained 1-cyano-10(9)-(N - methylmorpholinium) - 10(9) - hydroxyheptadecane chloride.

*Example II*

Into a stirred 500 milliliter 3-neck round-bottom flask were charged 160 grams of 9(10)-dimethylamino-10(9)-hydroxystearonitrile, 100 milliliters of absolute methanol, and 82 grams of methyl iodide. The reaction mixture was maintained at 40–60° C. for two hours and then allowed to remain at room temperature for 16 hours. The resulting viscous reaction mixture was stripped of solvent under vacuum and an attempt was made to ether extract unreacted amines from an ether-water system. However, three phases formed; the quaternary ammonium compound was apparently not appreciably soluble in ether. The quaternary ammonium layer was separated and dried. There was obtained 175 grams of 1-cyano-9(10)-(trimethyl ammonium) - 10(9) - hydroxyheptadecane iodide having a total amine number of 4, an amine number of 121 after treatment with mercuric acetate, and an amine hydrochloride number of 1.1 as compared to theoretical values of 0, 124, and 0. When 9(10)-dimethylamino-10(9)-hydroxypalmitonitrile is substituted for the 9(10)-dimethylamino-10(9)-hydroxystearonitrile of this example, there is obtained 1-cyano-9(10)-(trimethyl ammonium)-10(9)-hydroxypentadecane iodide.

*Example III*

Into a one liter stirred flask were charged 100 grams of 9(10)-dimethylamino-10(9)-hydroxystearonitrile, 47.5 grams of benzyl chloride, and 200 milliliters of absolute methanol. After heating the reaction mixture for 5 hours at 64–66° C., the reaction mixture was cooled and the solvent removed under vacuum. The residue was treated with ether and water and the aqueous phase twice extracted with ether. Evaporation of the ether gave 8 grams of unreacted starting material. The aqueous layer yielded 161 grams of 1-cyano-9(10)-(dimethylbenzyl ammonium) - 10(9) - hydroxyheptadecane chloride having a total amine number of 0.6, an amine hydrochloride number of 38 and 8.27% chlorine as compared to theoretical values of 0, 0, and 7.3%.

*Example IV*

Into a 500 milliliter stirred flask were charged 50 grams of 9(10)-dimethylamino-(10(9)-hydroxystearonitrile, 19 grams of allyl chloride, and 200 milliliters of absolute methanol. The reaction mixture was heated at 50 to 58° C. for 15 hours. After cooling the reaction mixture the volatiles were then removed under vacuum. The residue was treated with ether and water, and the water solution twice washed with additional ether. There was obtained 63 grams of 1-cyano-9(10)-dimethylallyl ammonium)-10(9)-hydroxyheptadecane chloride having a total amine number of 2, an amine number of 148 after treatment with mercuric acetate, an amine hydrochloride number of 23 and 8.8% chlorine as compared to theoretical values of 0, 145, 0, and 9.2%.

*Example V*

Into a 1 liter stirred flask were charged 50 grams of 9(10)-dimethylamino-10(9)-hydroxystearonitrile, 200 milliliters of absolute methanol, and 63 grams of 1,4-dichlorobutene-2 in 200 milliliters of absolute methanol. The temperature of the reaction mixture remained at room temperature during the 15 minute period of addition of the 1,4-dichlorobutene-2. The reaction temperature was then raised to 66° over a period of two hours and maintained at that temperature for an additional 18 hours. Over the reaction period, the total amine number of the product was gradually reduced to zero. The reaction mixture was then cooled and the solvent removed under vacuum. The product was taken up in water and extracted with ether to remove unreacted starting materials. There was recovered from the aqueous solution, 74 grams of 1-cyano-9(10)-(dimethyl-delta-chlorobut-2-enyl ammonium)-10(9)-hydroxyheptadecane chloride having an amine number of 1, and an amine number of 146 after treatment with mercuric acetate, an amine hydrochloride number of 51, and 8.7% chlorine as compared to theoretical values of 0, 128, 0, and 8.0%. The product was a dark, viscous liquid.

*Example VI*

Into a one liter stirred flask were charged 50 grams of 9(10)-dimethylamino-10(9)-hydroxystearonitrile, 300 milliliters of absolute methanol, and 10 grams of 1,4-dichlorobutene-2. The reaction temperature was gradually increased to 65° C., and maintained there for 120 hours. During the period the amine number of the reaction mixture gradually decreased. The reaction mixture was then cooled, the solvent removed under vacuum, the product taken up in water, and treated with ether to remove unreacted starting materials. There was obtained 35 grams of a clear, very viscous amber liquid having a total amine number of 1.4, an amine number of 142 after treatment with mercuric acetate, an amine hydrochloride number of 54.6, and 8.97% chlorine, as compared to theoretical values of 0, 150, 0, and 9.3. Much of the product was the diquaternary compound in which 1 mol of 1,4-dichlorobutene-2 reacted with 2 mols 9(10)-dimethylamino-10(9)hydroxystearonitrile.

*Example VII*

Into a stirred flask were charged 100 grams of technical grade 9(10)-methylamino-10(9)-hydroxystearonitrile having an amine number of 140 compared to theoretical value of 180, 100 grams isopropyl alcohol, and 33 grams of 1,4-dichlorobutene-2. The reaction mixture was agitated at room temperature for 1.5 hours, and heated to 85° C. in 30 minutes. Fourteen grams of sodium carbonate was added over a period of 2 hours while maintaining a reaction mixture at 84° C. A two-phase system resulted. The reaction was held at 84° C. for a period of 17 hours. The product was dissolved in water and extracted with ether and each phase back extracted. The organic materials were then recovered from each phase. The unreacted starting materials recovered from the ether phase had an amine number of 98.5 and an ionic chlorine analysis of 0.34%. The material recovered from the aqueous phase had a total amine number of 3.3, an amine number of 152.3 after treatment with mercuric acetate, 8.8 percent ionic chlorine and an amine hydrochloride number of 75, compared with theoretical values of 0, 152, 9.0, and 0. The amine hydrochloride number indicates that approximately half of the product is the amine hydrochloride. The other half of the product was the 1-cyano-9(10)-(methyl-1,4-dihydropyrrolium)-10(9)-hydroxyheptadecane chloride.

*Example VIII*

Into a stirred one liter flask equipped with reflux condenser were charged 150 grams of technical grade 9(10)-methylamino-10(9)-hydroxystearonitrile having an amine number of 140 as compared to a theoretical value of 181, 50 grams of 1,4-dichlorobutene-2, 21 grams of sodium carbonate and 180 grams of isopropyl alcohol. The mixture was heated to 86° C. and maintained at this reflux temperature for 22 hours. The reaction mixture was then cooled to 15° C. and the solid removed by filtration. The solvent was removed under reduced pressure and the residue dissolved in water and treated with diethylether. The phases were separated and each phase was back extracted. The respective fractions were then recovered from the ether and aqueous solutions. From the ether solution there was recovered 62 grams of unreacted starting materials having an amine number of 32. From the aqueous solution there was recovered 114 grams of product having an amine number of 4.8, an amine number of 142 after treatment with mercuric acetate, an amine hydrochloride number of 116, and 8.6% chlorine as compared to theoretical values of 0, 141.5, 0, and 9.0%, respectively. The amine hydrochloride number indicates that about 20% of the desired 1 - cyano - 9(10) - methyl - 1,4-dihydropyrrolium)-10(9)-hydroxyheptadecane chloride was obtained.

*Example IX*

Into a stirred autoclave were charged 110 grams of aminohydroxystearonitrile having an amine number of 190, 300 grams of isopropyl alcohol, and 43 grams of sodium hydroxide. The autoclave was pressured with methyl chloride and the reaction mixture was heated at 120° C. for 4.5 hours while maintaining the methyl chloride pressure at 90 to 150 p.s.i.g. The reaction mixture was then cooled, salt removed by filtration, and the solvent removed under reduced pressure. After dissolving the residual material in water and extracting with ether there was obtained from the aqueous solution a product having an amine number of 3.1, an amine hydrochloride number of 93 and 9.9% chlorine as compared to theoretical values of 0, 0, and 9.5%. The product contained approximately 40% of the desired 1-cyano-9(10)-(trimethyl ammonium)-10(9)-hydroxyheptadecane chloride.

*Example X*

Into a 500 milliliter stirred flask were charged 41 grams of 9(10)-dimethylamino-10(9)-hydroxystearonitrile having an amine number of 175, 1.7 grams of sodium bicarbonate and 57 grams of isopropanol. When 16.2 grams of dimethyl sulfate was added to the reaction mixture, the temperature increased from 32° C. to 65° C. After heating for 1.75 hours at 65° C. to 86° C., the reaction mixture was cooled and filtered. There was obtained an isopropanol solution of 1-cyano-9(10)-(trimethyl ammonium)-10(9)-hydroxyheptadecane methyl sulfate having 1.9% free amine, 6.5% amine methyl hydrogen sulfate and 58.5% solids.

The foregoing examples have been included as illustrations of certain preferred embodiments of the present invention and are not to be construed as limitations on the scope thereof. Numerous variations will be apparent from the foregoing description and examples.

The compounds of the present invention are useful as corrosion inhibitors, soil stabilizers, bacteriostats, and mineral extracting agents.

The embodiments of the present invention in which an exclusive property or privilege is claimed, are defined as follows.

What is claimed is:
1. 1 - cyano - 9 - (trimethylammonium) - 10 - hydroxyheptadecane chloride.
2. 1-cyano-10-(trimethylammonium)-9 - hydroxyheptadecane chloride.
3. 1 - cyano - 9 - (dimethylbenzylammonium) - 10 - hydroxyheptadecane chloride.
4. 1-cyano-10-(dimethylbenzylammonium)-9-hydroxyheptadecane chloride.
5. 1 - cyano - 9 - (trimethylammonium) - 10 - hydroxyheptadecane iodide.
6. 1-cyano-10-(trimethylammonium) -9-hydroxyhaptadecane iodide.
7. 1-cyano-9-(dimethylallyl ammonium) - 10 - hydroxyheptadecane chloride.
8. 1 - cyano -10 - (dimethylallyl ammonium)-9-hydroxyheptadecane chloride.
9. 1 - cyano - 9 - (methyl-1,4-dihydropyrrolium)-10-hydroxyheptadecane chloride.
10. 1-cyano-10-(methyl-1,4-dihydropyrrolium) - 9 - hydroxyheptadecane chloride.
11. 1 - cyano - 9-(N-methylmorpholinium)-10-hydroxyheptadecane chloride.
12. 1-cyano-10-(N-methylmorpholinium) - 9 - hydroxyheptadecane chloride.
13. 1 - cyano - 9 - (dimethylbenzyl ammonium)-10-hydroxypentadecane chloride.
14. 1-cyano-10 - (dimethylbenzyl ammonium) - 9 - hydroxypentadecane chloride.
15. 1-cyano-9-(trimethyl ammonium)-10-hydroxyheptadecane methyl sulfate.
16. 1-cyano-10-(trimethyl ammonium)-9-hydroxyheptadecane methyl sulfate.

No references cited.